(12) United States Patent
Malkowski et al.

(10) Patent No.: US 10,723,558 B2
(45) Date of Patent: Jul. 28, 2020

(54) SNAP ON SLAT FOR A CHAIN CONVEYOR BELT AND CONVEYOR BELT SYSTEM COMPRISING SAME

(71) Applicant: PRINCE CASTLE LLC, Carol Stream, IL (US)

(72) Inventors: Dennis Malkowski, Yorkville, IL (US); Richard Bauer, Palatine, IL (US)

(73) Assignee: Prince Castle LLC, Carol Stream, IL (US)

(*) Notice: Subject to any disclaimer, the term of this patent is extended or adjusted under 35 U.S.C. 154(b) by 423 days.

(21) Appl. No.: 15/416,707

(22) Filed: Jan. 26, 2017

(65) Prior Publication Data
US 2017/0210567 A1    Jul. 27, 2017

Related U.S. Application Data

(60) Provisional application No. 62/287,441, filed on Jan. 27, 2016.

(51) Int. Cl.
*A47J 37/08* (2006.01)
*B65G 17/34* (2006.01)
(Continued)

(52) U.S. Cl.
CPC .......... *B65G 17/34* (2013.01); *A47J 37/0857* (2013.01); *B65G 15/54* (2013.01); *B65G 17/064* (2013.01); *B65G 17/065* (2013.01); *B65G 17/067* (2013.01); *B65G 17/083* (2013.01); *B65G 17/44* (2013.01)

(58) Field of Classification Search
CPC ... A47J 37/0857; B65G 15/54; B65G 17/064; B65G 17/065; B65G 17/067; B65G 17/083; B65G 17/34; B65G 17/44; B65G 25/065

USPC ....... 198/850–853, 750.3, 750.4, 834, 844.1, 198/848; 99/386
See application file for complete search history.

(56) References Cited

U.S. PATENT DOCUMENTS 527,723 A    10/1894    Sargent
861,484 A    7/1907     Stewart
(Continued)

FOREIGN PATENT DOCUMENTS

EP    0068886 A2    1/1983
EP    1975093 A1    10/2008
(Continued)

OTHER PUBLICATIONS

European patent application No. 17153145.2, Communication Pursuant to Article 94(3) EPC, dated Apr. 10, 2018.
(Continued)

*Primary Examiner* — Tu B Hoang
*Assistant Examiner* — Tiffany T Tran
(74) *Attorney, Agent, or Firm* — Andrus Intellectual Property Law, LLP (57) ABSTRACT

A conveyor belt system provides a continuous flat support surface for a food item that moves the food item through a food preparation device. The conveyor belt system includes a conveyor belt having a plurality of spaced apart rods and a plurality of slats that are removably attached to the conveyor belt with a snap on mechanism. The slats are easily assembled and provide enhanced field service and/or replacement capability.

16 Claims, 9 Drawing Sheets

(51) Int. Cl.
  *B65G 15/54* (2006.01)
  *B65G 17/06* (2006.01)
  *B65G 17/08* (2006.01)
  *B65G 17/44* (2006.01)

(56) References Cited

U.S. PATENT DOCUMENTS

| | | | |
|---|---|---|---|
| 2,987,167 A | 6/1961 | Franz | |
| 3,098,875 A | 7/1963 | Schmerling | |
| 3,174,618 A | 3/1965 | Wesson | |
| 3,339,712 A | 9/1967 | Anderson | |
| 3,416,645 A * | 12/1968 | Jones | B65G 17/068 198/833 |
| 3,447,668 A | 6/1969 | Jernigan | |
| 3,465,489 A * | 9/1969 | Monaghan | B65B 9/026 53/450 |
| 3,680,927 A | 8/1972 | Neureuther | |
| 3,693,452 A | 9/1972 | McGinley et al. | |
| 3,876,547 A * | 4/1975 | Kaess | B01D 29/09 198/850 |
| 3,976,192 A | 8/1976 | Muller | |
| 4,027,792 A | 6/1977 | Jeter | |
| 4,281,594 A | 8/1981 | Baker et al. | |
| 4,281,760 A | 8/1981 | Muller | |
| 4,394,901 A | 7/1983 | Roinestad | |
| 4,473,365 A | 9/1984 | Lapeyre | |
| 4,553,663 A | 11/1985 | Johnson | |
| 5,174,438 A | 12/1992 | Witham et al. | |
| 5,307,923 A | 5/1994 | Damkjaer | |
| 5,316,130 A * | 5/1994 | Heit | B65G 17/44 198/781.06 |
| 5,316,133 A | 5/1994 | Moser | |
| 5,358,095 A | 10/1994 | Curl | |
| 5,473,975 A | 12/1995 | Bruno et al. | |
| 5,588,354 A | 12/1996 | Stuck et al. | |
| 5,738,223 A | 4/1998 | Rohrs | |
| 6,223,889 B1 | 5/2001 | Layne et al. | |
| 6,311,610 B1 | 11/2001 | Kettman | |
| 6,581,758 B1 | 6/2003 | van-Zijderveld et al. | |
| 6,707,014 B1 | 3/2004 | Corey et al. | |
| 6,918,486 B2 | 7/2005 | Shibayama et al. | |
| 7,278,535 B2 | 10/2007 | Damkjær | |
| 7,314,132 B2 | 1/2008 | Layne et al. | |
| 7,419,051 B2 | 9/2008 | Damkjær | |
| 7,530,455 B2 | 5/2009 | Lucchi | |
| 7,708,135 B2 | 5/2010 | Ellerth et al. | |
| 7,721,877 B2 | 5/2010 | Maine, Jr. et al. | |
| 7,800,023 B2 | 9/2010 | Burtea et al. | |
| 7,878,323 B2 | 2/2011 | Van Rees et al. | |
| 7,896,766 B2 | 3/2011 | Mitzschke et al. | |
| 7,975,840 B2 | 7/2011 | Messick, Jr. et al. | |
| 7,987,972 B2 | 8/2011 | Hennigar et al. | |
| 8,113,340 B1 | 2/2012 | Smith et al. | |
| 8,499,928 B1 | 8/2013 | Liao et al. | |
| 8,506,687 B2 | 8/2013 | Jones | |
| 8,752,698 B2 | 6/2014 | Lasecki et al. | |
| 8,863,944 B2 | 10/2014 | MacLachlan | |
| 8,939,279 B2 | 1/2015 | Porter et al. | |
| 9,073,694 B2 | 7/2015 | Ozaki | |
| 9,221,611 B2 | 12/2015 | Ulchak et al. | |
| 9,540,175 B1 | 1/2017 | Van Dalsem et al. | |
| 9,889,992 B1 | 2/2018 | Adomaitis et al. | |
| 10,173,844 B2 | 1/2019 | Adomaitis et al. | |
| 2004/0211323 A1 | 10/2004 | Heinzen et al. | |
| 2007/0169630 A1 | 7/2007 | Auyoung | |
| 2008/0073184 A1 | 3/2008 | Yoshida | |
| 2008/0105519 A1 | 5/2008 | Harrison | |
| 2009/0133993 A1 | 5/2009 | Ishikawa et al. | |
| 2010/0143557 A1 | 6/2010 | Chung et al. | |
| 2010/0275789 A1 * | 11/2010 | Lee | A47J 37/0857 99/386 |
| 2011/0277643 A1 | 11/2011 | Schwierking et al. | |
| 2012/0048689 A1 | 3/2012 | Hastem-Mueller | |
| 2013/0048473 A1 | 2/2013 | Gough | |
| 2015/0129395 A1 | 5/2015 | Messick, Jr. | |
| 2015/0151919 A1 | 6/2015 | Messick, Jr. et al. | |
| 2015/0191312 A1 | 7/2015 | Ulchak et al. | |
| 2016/0185529 A1 | 6/2016 | Bauer | |
| 2016/0185530 A1 | 6/2016 | Malkowski et al. | |
| 2016/0368711 A1 | 12/2016 | Ulchak et al. | |
| 2017/0210567 A1 | 7/2017 | Malkowski et al. | |

FOREIGN PATENT DOCUMENTS

| | | | |
|---|---|---|---|
| GB | 1463066 A * | 2/1977 | B65G 17/067 |
| JP | H06-141985 A | 5/1994 | |
| JP | 2012041145 A | 3/2012 | |

OTHER PUBLICATIONS

Extended European Search Report, European patent application No. 17153145.2, dated May 30, 2017.

European Patent Application No. 17153145.2, Communication under Rule 71(3) EPC, dated Jan. 25, 2019.

\* cited by examiner

SNAP ON SLAT FOR A CHAIN CONVEYOR BELT AND CONVEYOR BELT SYSTEM COMPRISING SAME

FIELD OF THE INVENTION

The disclosure is directed to a conveyor belt for conveying food items into a heated food preparation chamber, such as a toaster. In particular, the disclosure is directed to a snap on slat for a conveyor belt that minimizes costs, simplifies field maintenance, and simplifies manufacturing and assembly of a conveyor belt including the snap on slat.

BACKGROUND

In the food preparation industry often food items are prepared, at least partially, by placing the food items on a conveyor belt that transports the food items into a food preparation device, such as a toaster. Such toasters include a heated platen and a slowly rotating conveyor belt. The conveyor belt holds the food item in close proximity to the platen while the conveyor belt simultaneously transports the food item through the preparation device. The length of time the food item is exposed to the heated platen may vary based on the length of the platen and the speed of the conveyor belt. Such toasters may process food items continuously as opposed to household toasters that process food items in batch mode, such as two or four pieces of bread at a time. Conveyor toasters are ill-suited for consumer use because of their size, manufacturing cost, power requirements, and the time required to pre-heat the platen to operating temperature. However, conveyor toasters are preferred by restaurants and food services that require high-volume through-put and consistent heating/toasting.

Figure 1:
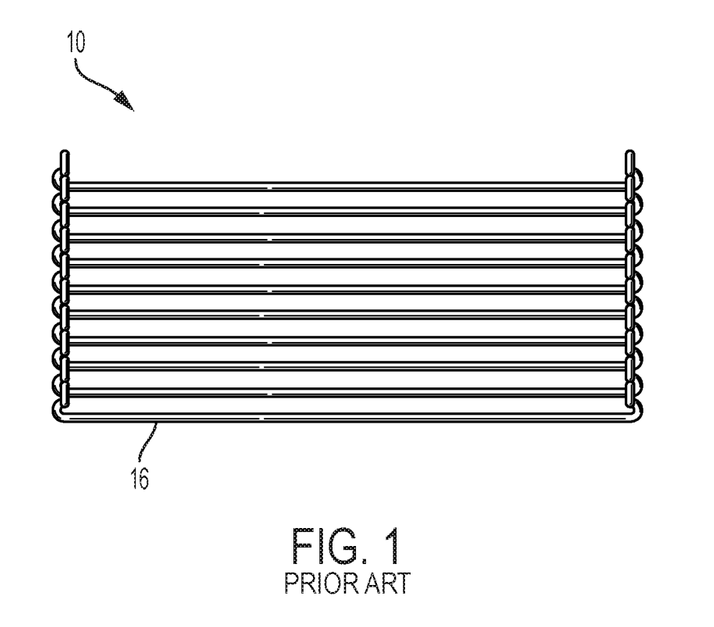
FIG. 1 is a top view of a segment of a conventional wire conveyor belt.
Figure 2:
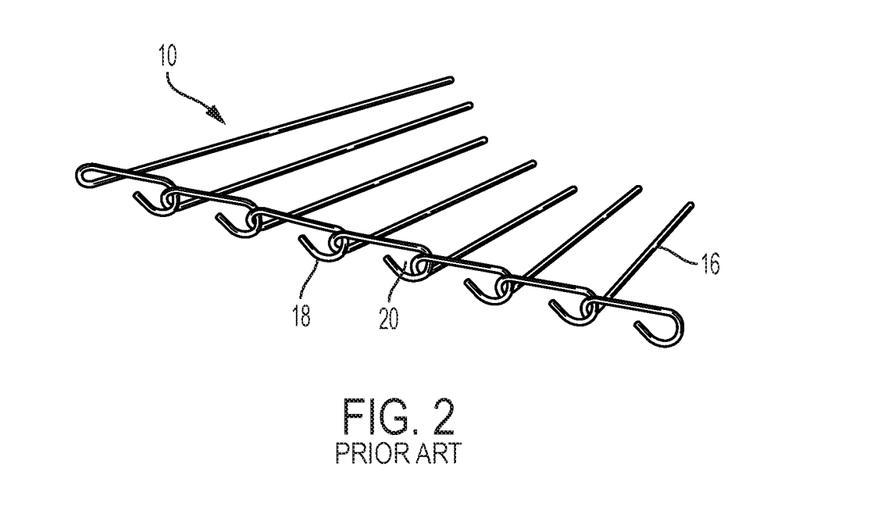
FIG. 2 is a side perspective view of the wire conveyor belt segment shown in FIG. 1.

Conveyor toasters generally include a wire conveyor belt. Wire conveyor belts are ideal for material handling, cooking, icing, slicing breading, cooling, filling, inspecting, and packing of products like breads, rolls, buns, donuts, confections, cakes, pies, pastries, meat, seafood, poultry, and other processed foods. The simple, open design of wire conveyor belts provides efficient operation with minimum maintenance and easy cleanup to meet sanitation requirements. One such known wire conveyor belt is illustrated in FIGS. 1 and 2. The wire conveyor belt 10 may include a plurality of spaced metal rods 16 interconnected by coupling "hook" and "loop" connection elements 18, 20 formed at the rod ends of adjacent metal rods 16. The rods 16 may support a food item and the rods 16 may hold the components of the belt together by way of the interconnected hook and loop connection elements 18, 20.

One known conveyor belt, for example, is the wire conveyor belt disclosed in U.S. Pat. No. 7,987,972, which is herein incorporated by reference in its entirety. The wire conveyor belt provides a flat support surface, but is relatively expensive to produce and is cumbersome to assemble and relatively difficult to repair or replace in the field. The plates are attached to a first spaced rod at a first end and to a second spaced rod that is adjacent to the first spaced rod at the second end.

DETAILED DESCRIPTION

A conveyor belt system with snap on slats supports a food product and moves the food product through a food preparation device, such as a toaster or oven, without substantially marking or pinching the food product. Additionally, the conveyor belt system with snap on slats eases assembly of the conveyor belt system while also providing the ability to replace or repair individual slats in the field without the need for specialized tools. Individual slats may be made of any material that is durable enough to withstand temperatures within the food preparation device. Examples of slat materials include metals, such as copper, iron, aluminum, and nickel, and/or metal alloys such as steel, brass, and bronze. Stainless steel is one preferred material for manufacturing the slats and AISI T-304 is an exemplary type of stainless steel that may be preferred.

Figure 3:
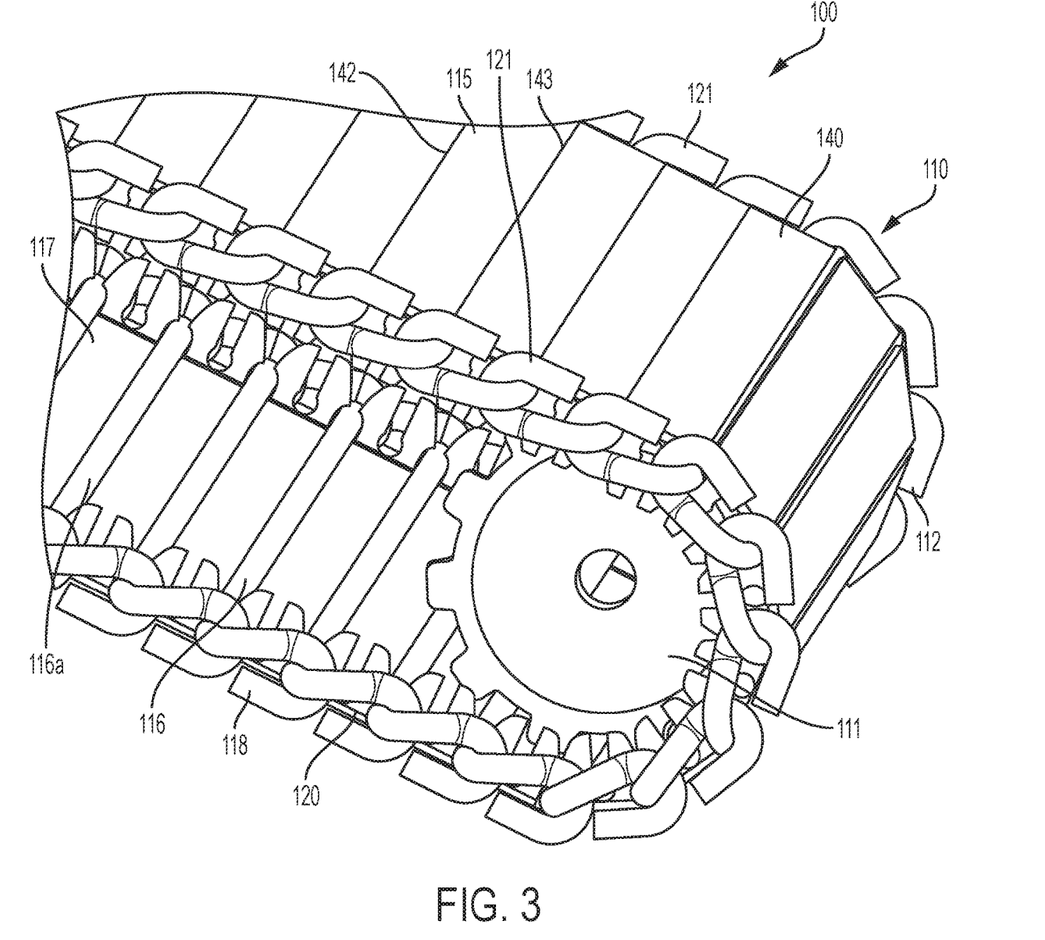
FIG. 3 is a partial perspective view of a conveyor belt system constructed in accordance with the disclosure, the system includes a conveyor belt and a plurality of slats removably coupled to the conveyor belt.

Turning now to FIG. 3, a conveyor belt system 100 includes a wire conveyor belt assembly 110 and a drive mechanism, such as a drive sprocket 111. The wire conveyor belt assembly 110 includes a wire conveyor belt 112 and a plurality of removable slats 140. The plurality of removable slats 140 form a continuous flat support surface for conveying an item, particularly a food item through a food preparation device, such as a toaster or oven.

The conveyor belt 112 comprises a plurality of spaced metal rods 116 disposed in succession and transversely with respect to a direction of conveyance. The plurality of spaced rods 116 form the wire conveyor belt 112 which serves, in part, as a scaffolding for the plurality of removable slats 140. The wire conveyor belt 112 also interacts with the drive mechanism, to move the rods 116 and the removable slats 140 through the food preparation device. Other scaffoldings capable of receiving removable slats 140 may also be used. In the embodiment illustrated in FIGS. 3 and 4, each rod 116 has two end portions 121 and a supporting rod portion 116a extending therebetween. Each end portion 121 includes a terminal hook connection element 118 that protrudes in a first direction, curves, and extends in a direction substantially opposite to the first direction for a predetermined distance. Each rod 116 also has two loop connection elements 120, which are formed in the rods 116 themselves. The hook connection elements 118 are interconnected/ coupled to the loop connection elements 120 of an adjacent spaced metal rod 116 to interlock adjacent metal rods 116. The hook connection elements 118 and the loop connection elements 120 interact to allow adjacent rods 116 to pivot about an axis of the rod 116, for example while turning around the sprocket 111, while securing adjacent rods 116 to one another.

Figure 4:
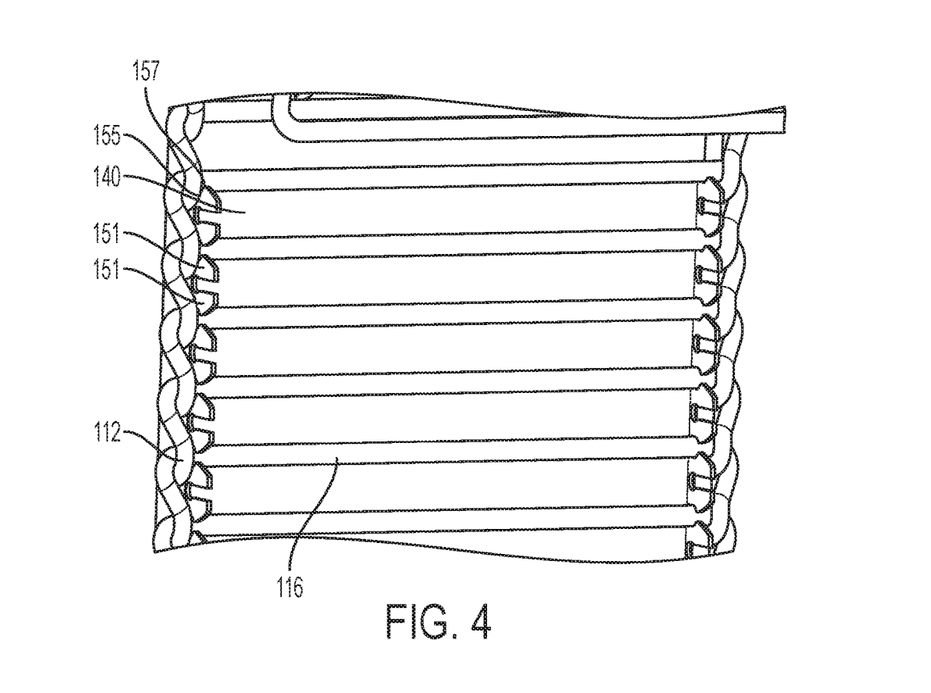
FIG. 4 is a bottom perspective view of the conveyor belt system of FIG. 3.

The conveyor belt assembly 110 includes the plurality of spaced metal rods 116 and the plurality of substantially flat slats 140. The slats 140 form a top side, or support surface, 115 and a bottom side 117. The top side 115 forms a flat support surface for conveying the food product, and the bottom side 117 forms a platform that is at least partially supported by the rods 116.

The support surface 115 is formed by the plurality of slats 140 which are coupled to selected rods 116 of the plurality of spaced metal rods 116. The slats 140 are secured at least partially between a first spaced rod 116 of the plurality of spaced rods 116 and a second spaced rod 116, the second spaced rod 116 being separated from the first spaced rod and supporting the slat 140 so that a leading edge 142 and a trailing edge 143 are unsecured and free of any attachment, but supported along the bottom 117, thereby providing a joint that allows adjacent slats 140 to partially rotate relative to one another at the leading edge of each slat 140 and at the trailing edge of each slat 140, for example, when the slats 140 turn around the sprocket 111.

Figure 5:
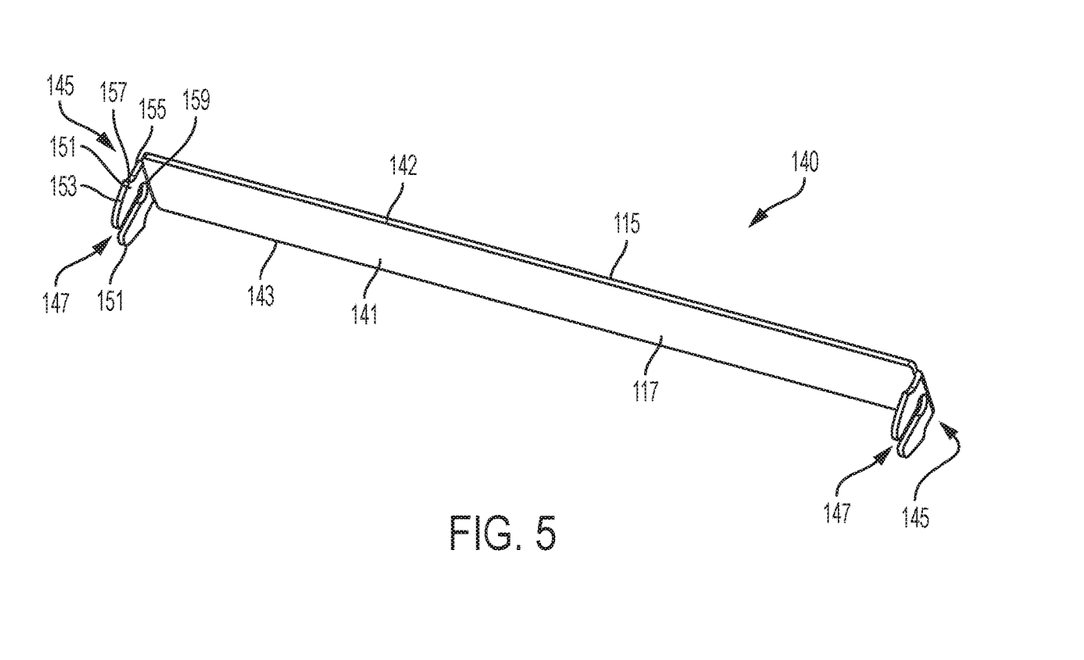
FIG. 5 is a perspective view of one embodiment of a slat of the conveyor belt system of FIG. 3.

Turning now to FIG. 5, each slat 140 includes a flat base portion 141 having a leading edge 142 and a trailing edge 143 relative to the direction of conveyance. Each slat 140 also includes a snap on connection element 145 at each end of the flat base portion 141. The snap on connection element 145 extends substantially perpendicular to the flat base portion 141 and away from the top surface 115. The snap on connection element 145 removably secures the slat 140 to the conveyor belt 112 by sliding between two adjacent rods 116 and expanding after passing the rods 116 so that the slat 140 may be separated from the conveyor belt 112 by applying a force in a direction opposite the snap on connection element 145, for example, by pulling the slat 140 away from the conveyor belt 112. The snap on connection element 145 leaves the leading edge 142 and the trailing edge 143 free of any attachment either with adjacent slats 140 or with the rods 116, so that adjacent slats 140 may partially rotate relative to one another, for example when rotating around the sprocket 111 (FIG. 3).

The snap on connection element 145 may include two spaced apart legs 151 that are separated from one another by a gap 147. Each leg 145 may include an angled leading surface 153 and a notch 155. The angled leading surface 153 divides the leg 151 into a narrower portion distal to the flat base portion 141 and wider portion proximate to the flat base portion 141. A peak 157 may be formed between the angled leading surface 153 and the notch 155, the peak 157 defining the widest location of the leg 151. The notch 155 may be sized and shaped to receive one rod 116 between the peak 157 and the flat base portion 141. For example, the notch 155 may include a curved surface that forms an arc of a circle, to complement the outer surfaces of the cylindrical rods 116. The gap 147 allows the legs 151 to be displaced towards one another when the slat 140 is being secured to the conveyor belt 112. The gap 147 may include a radiused top 159 that disperses material stress, especially when the two legs 151 are displaced towards one another during installation of the removable slat 140.

As illustrated in FIG. 4, when the slat 140 is secured to the conveyor belt 112, the legs 151 extend between adjacent rods 116. One rod 116 being seated within the notch 155 of a first leg 151 (e.g., a front leg) and another rod 116 being seated within the notch 155 of a second leg 151 (e.g., a back leg). The peak 157 prevents the legs 151 from backing out of the gap between the rods 116. To remove the slat 140, a force may be applied in a direction away from the rods 116 (e.g., away from the rods 116), which will cause the legs 151 to deform inwardly, towards one another, due to the curved surface of the notch 155 leading up to the peak 157. As the force increases, the peak 157 will eventually move far enough towards the other leg 151 that the peak 157 will be able to pass by the rod 116, thereby allowing the slat 140 to be removed from the conveyor belt 112. Alternatively, a force may be applied directly to the legs 151, pinching the distal ends of the angled leading surfaces 153 towards one another, causing the legs 151 to move towards one another to allow the peak 157 to clear the rod 116, before separating the removable slat 140 from the conveyor belt 112.

Conversely, to secure the removable slat 140 to the conveyor belt 112, the angled leading surfaces 153 of the legs 151 may be placed into a gap between two rods 116. A force may be applied towards the conveyor belt 112, which causes the legs 151 to deform inwardly, towards one another, due to the slope of the angled leading surfaces 153. Eventually, the legs 151 will deform sufficiently to allow the peak 157 to pass over the rod 116. Once the peak 157 is clear of the rod 116, the legs 151 will return to their original position, expanding away from one another, which allows the rod 116 to seat within the notch 155. The same rod 116 may also seat within a notch 155 of an adjacent slat 140. Alternatively, a force may be applied directly to the legs 151, proximate the distal ends of the angled leading surfaces 153, causing the legs 151 to move towards one another to allow the peak 157 to clear the rod 116, before moving the slat 140 towards the conveyor belt 112. Once the legs 151 are sufficiently deformed, the legs 151 may be moved into a gap between adjacent rods 116, and once the peak 157 is clear of the rod 116, the legs 151 may be allowed to expand away from one another into their original positions, which allows the rod 116 to seat in the notch 155.

The removable slats 140 are preferably formed from a metal material, such as stainless steel, or any other suitable material. For example, the removable slats 140 may be manufactured from an extrudable material including, but not limited to, extrudable metals, extrudable polymers, and extrudable ceramics. Exemplary extrudable metals include, but are not limited to, aluminum, brass, copper, magnesium, and steel. Aluminum alloys such as hard coated anodized aluminum, for example AA 6063-T6, are preferred. Exemplary extrudable plastics include, but are not limited to, polyvinylchlorides, polyethylenes, polypropylenes, acetals, acrylics, nylons (polyamides), polystyrene, acrylonitrile butadiene styrenes, and polycarbonates.

In the conveyor belt system 100 of FIG. 3, the top surfaces 115 of the removable slats 140 are generally smooth. The top surfaces may, however, be corrugated or textured to better grip an item. In other embodiments, the top surfaces of the removable slats 140 may include gripping features to retain an item while the item is transported to facilitate the frictional engagement of the food product. The roughness of the surface of the removable slats 140 in one embodiment may be provided by shot peening the surfaces of the slats 140 using a predetermined shot size, as is disclosed in U.S. Patent Publication No. 2010/0275789, which is herein incorporated by reference in its entirety. Alternatively, the surface of the removable slat 140 may have gripping features such as an abrasive coating, dimples, furrows, or protrusions that would be strong enough to grip the food product, but not so abrasive that the gripping features rip, tear, or mark the food product.

Figure 6:
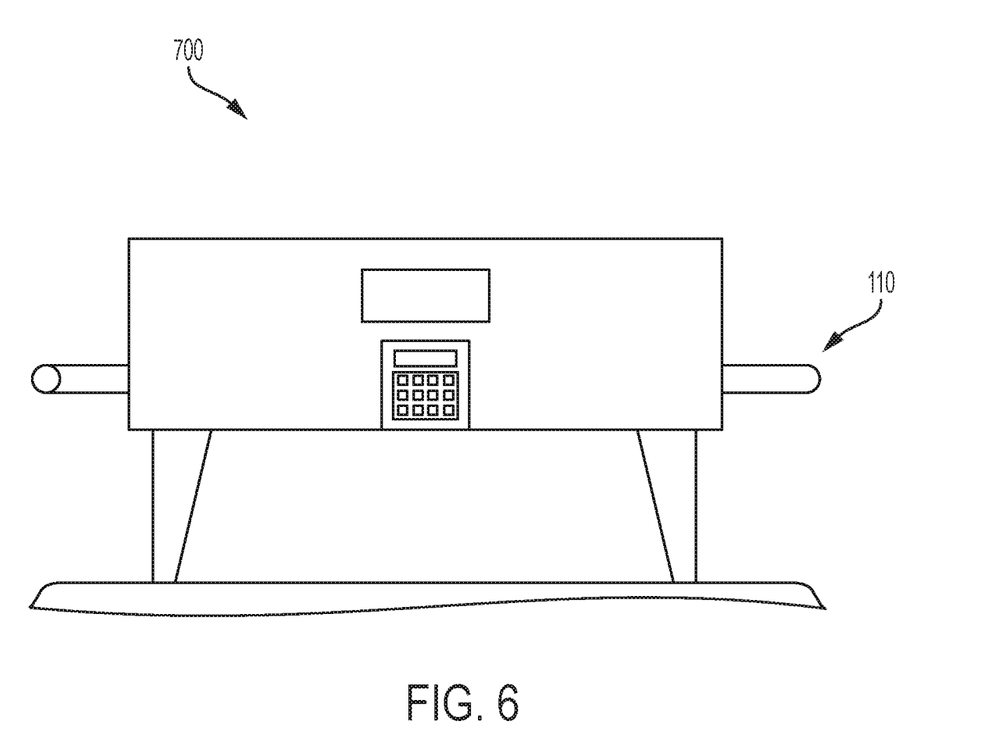
FIG. 6 is a perspective view of a horizontal toaster including the conveyor belt system of FIG. 3.
Figure 7:
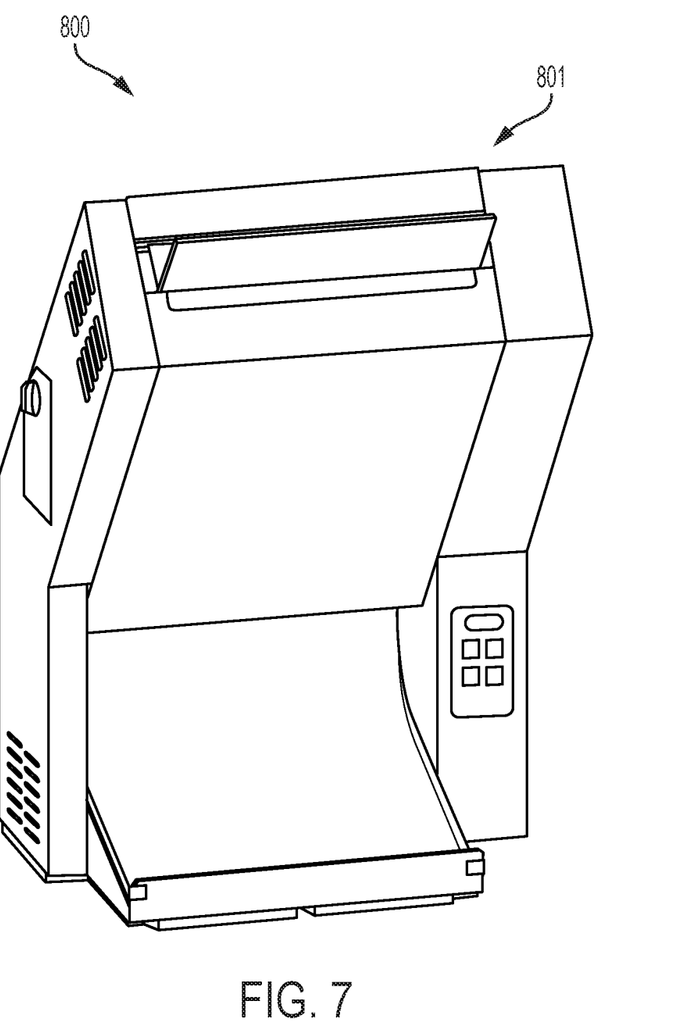
FIG. 7 is a perspective view of a vertical toaster having an angled product feed chute and including the conveyor belt system of FIG. 3.
Figure 8:
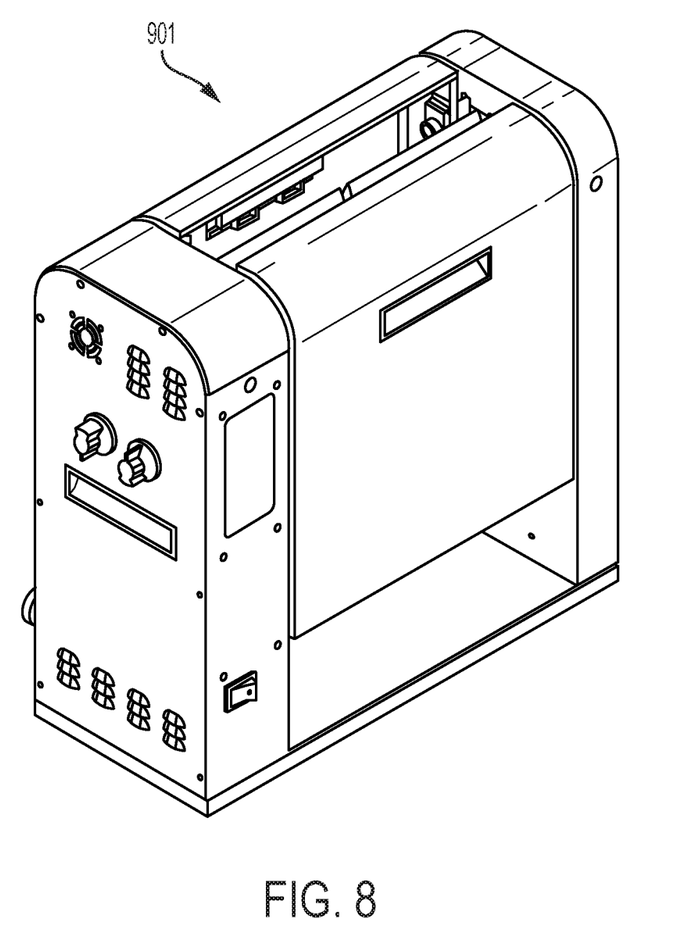
FIG. 8 is a perspective view of a vertical toaster having a vertical product feed chute and including the conveyor belt system of FIG. 3.

The conveyor belt system 100 may be used in a horizontal toaster 700 as illustrated in FIG. 6, an angled toaster 800 as illustrated in FIG. 7, or a vertical toaster 901 as illustrated in FIG. 8.

Existing conveyor toasters usually include a product feed where the product is inserted into an opening of the toaster. For example, in the angled toaster 800 in FIG. 7, the product travels down an angled shoot 801, usually angled at about 45 degrees, and is received by a conveyor belt 110 (not shown in FIG. 7). The conveyor belt assembly 110 receives the food product and urges it through an opening between the conveyor belt and a heated platen. In some conveyor toasters, the food product is compressed through this opening between the platen and the conveyor belt, also called a compressive gap, to process the food product.

Figure 9:
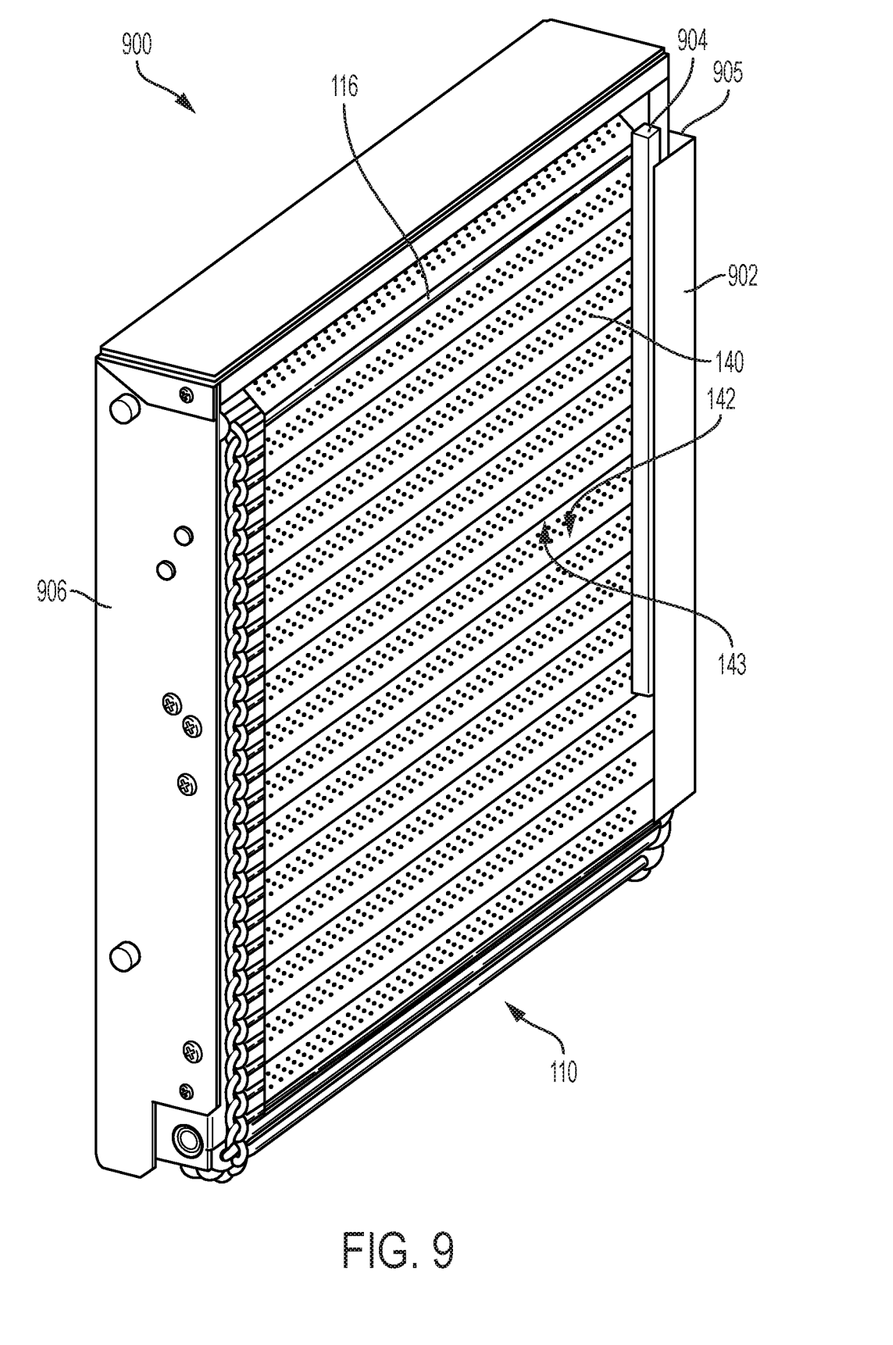
FIG. 9 is a perspective view of the vertical toaster of FIG. 8 with a cover removed revealing the conveyor belt system of FIG. 3.

The disclosed conveyor belt system 100 may be used in a vertical toaster 901, as illustrated in FIG. 8. The vertical toaster 901, an example of which is disclosed in U.S. Patent Publication No. 2010/02757789, has multiple removable and adjustable conveyor belts that receive a food product at an opening at the top of the toaster. As illustrated in FIG. 9, a vertical conveyor belt system 900 may include a guide structure 902 that runs the full length of the conveyor belt 112. In one embodiment, the conveyor belt system 900 may include a guide structure 902 on both ends of the conveyor belt assembly 110. The guide bar 904 may be fixed to a bracket 905 that attaches the guide bar 904 to the conveyor belt housing 906. The vertical toaster 901 includes a heating element (not shown), such as a heated platen, for example.

Figure 10:
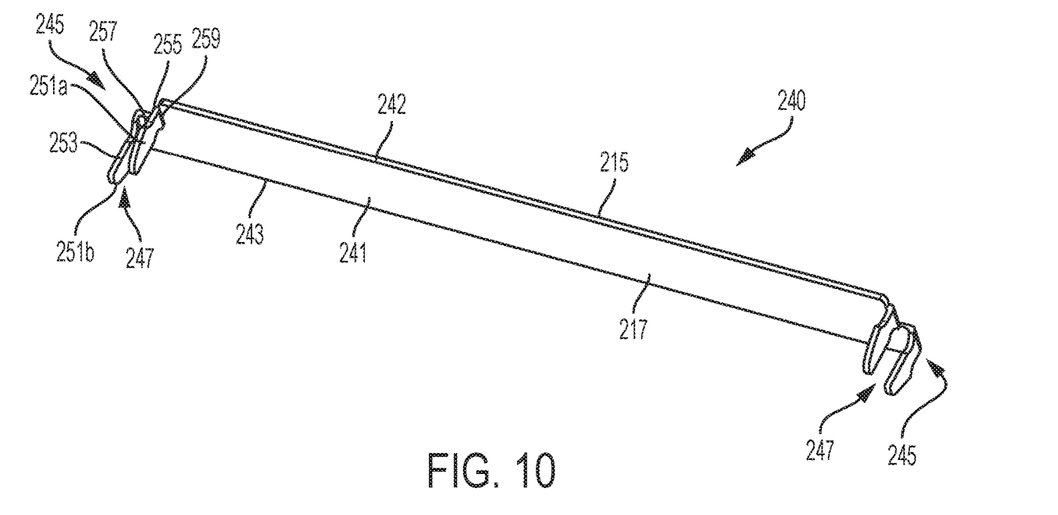
FIG. 10 is a perspective view of another embodiment of a slat of the conveyor belt system of FIG. 3.

Turning now to FIG. 10, an alternate embodiment of a slat 240 is illustrated. Each slat 240 includes a flat base portion 241 having a leading edge 242 and a trailing edge 243 relative to the direction of conveyance. Each slat 240 also includes a snap on connection element 245 at each end of the flat base portion 241. The snap on connection element 245 extends substantially perpendicular to the flat base portion 241 and away from the top surface 215. The snap on connection element 245 removably secures the slat 240 to the conveyor belt 112 by sliding between two adjacent rods 116 and expanding after passing the rods 116 so that the slat 240 may be separated from the conveyor belt 112 by applying a force in a direction opposite the snap on connection element 245, for example, by pulling the slat 240 away from the conveyor belt 112. The snap on connection element 245 leaves the leading edge 242 and the trailing edge 243 free of any attachment either with adjacent slats 240 or with the rods 116, so that adjacent slats 240 may partially rotate relative to one another, for example when rotating around the sprocket 111 (FIG. 3).

The snap on connection element 245 may include two spaced apart legs 251a, 251b that are separated from one another by a gap 247. Each leg 251a, 251b may include an angled leading surface 253 and a notch 255. The angled leading surface 253 divides the legs 251a, 251b into a narrower portion distal to the flat base portion 241 and wider portion proximate to the flat base portion 241. A peak 257 may be formed between the angled leading surface 253 and the notch 255, the peak 257 defining the widest location of each leg 251a, 251b. The notch 255 may be sized and shaped to receive one rod 116 between the peak 257 and the flat base portion 241. For example, the notch 255 may include a curved surface that forms an arc of a circle, to complement the outer surfaces of the cylindrical rods 116. The gap 247 allows the legs 251a, 251b to be displaced towards one another when the slat 240 is being secured to the conveyor belt 112. The gap 247 may include a radiused top 259 that disperses material stress, especially when the two legs 251a, 251b are displaced towards one another during installation of the removable slat 240.

In the embodiment illustrated in FIG. 10, a first leg 251a is offset in a lateral direction from a second leg 251b. Offsetting the legs 251a, 251b in the width direction from one another can advantageously enhance clearance between legs 251a, 251b on adjacent slats 240, thereby preventing interference between adjacent legs 251a, 251b.

Figure 11:
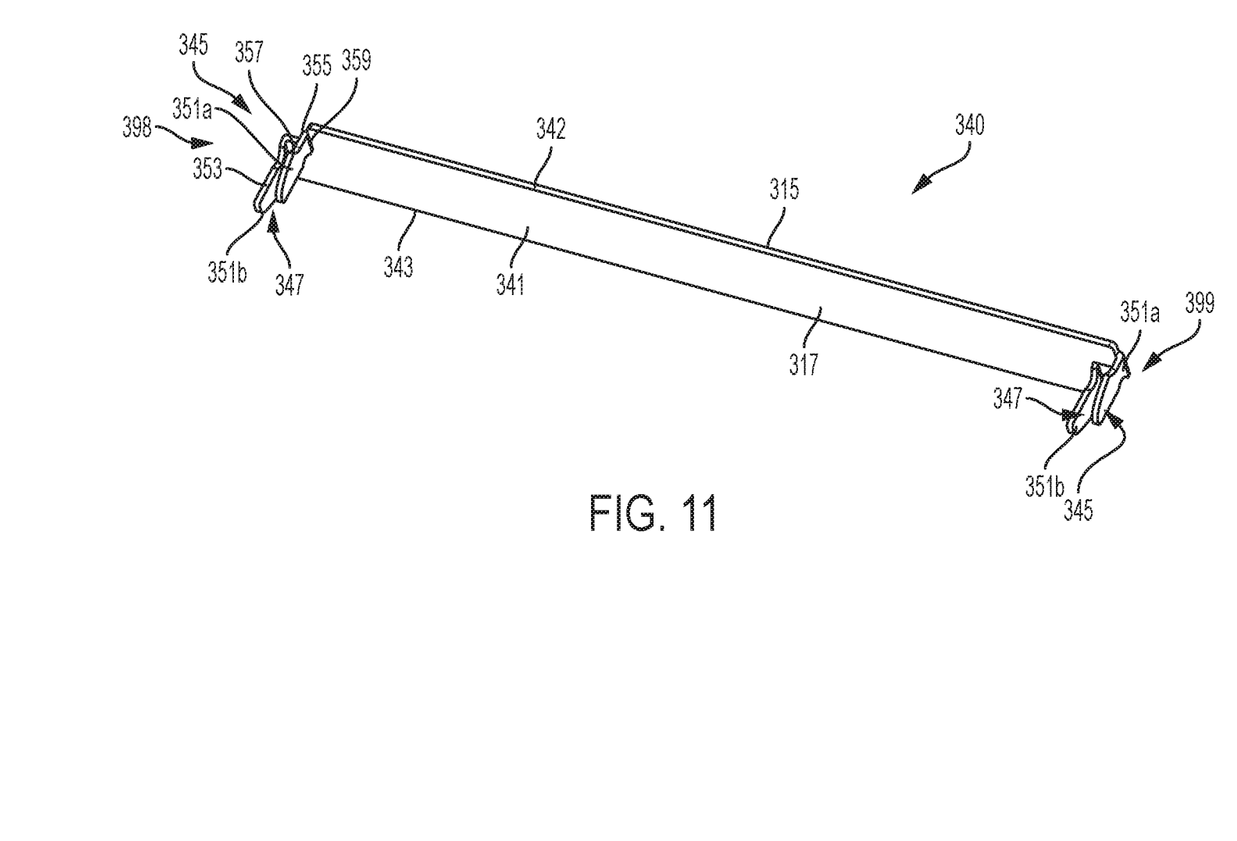
FIG. 11 is a perspective view of yet another embodiment of a slat of the conveyor belt system of FIG. 3

Turning now to FIG. 11, yet another alternate embodiment of a slat 340 is illustrated. Each slat 340 includes a flat base portion 341 having a leading edge 342 and a trailing edge 343 relative to the direction of conveyance. Each slat 340 also includes a snap on connection element 345 at each end of the flat base portion 341. The snap on connection element 345 extends substantially perpendicular to the flat base portion 341 and away from the top surface 315. The snap on connection element 345 removably secures the slat 340 to the conveyor belt 112 by sliding between two adjacent rods 116 and expanding after passing the rods 116 so that the slat 340 may be separated from the conveyor belt 112 by applying a force in a direction opposite the snap on connection element 345, for example, by pulling the slat 340 away from the conveyor belt 112. The snap on connection element 345 leaves the leading edge 342 and the trailing edge 343 free of any attachment either with adjacent slats 340 or with the rods 116, so that adjacent slats 340 may partially rotate relative to one another, for example when rotating around the sprocket 111 (FIG. 3).

The snap on connection element 345 may include two spaced apart legs 351a, 351b that are separated from one another by a gap 347, which is not clearly illustrated in FIG. 11 because of the perspective nature of the figure, but the gap 347 is consistent with the gap 247 shown in FIG. 10 and the gap 147 shown in FIGS. 3 and 5. Each leg 351a, 351b may include an angled leading surface 353 and a notch 355. The angled leading surface 353 divides the legs 351a, 351b into a narrower portion distal to the flat base portion 341 and wider portion proximate to the flat base portion 341. A peak 357 may be formed between the angled leading surface 353 and the notch 355, the peak 357 defining the widest location of each leg 351a, 351b. The notch 355 may be sized and shaped to receive one rod 116 between the peak 357 and the flat base portion 341. For example, the notch 355 may include a curved surface that forms an arc of a circle, to complement the outer surfaces of the cylindrical rods 116. The gap 347 allows the legs 351a, 351b to be displaced towards one another when the slat 340 is being secured to the conveyor belt 112. The gap 347 may include a radiused top 359 that disperses material stress, especially when the two legs 351a, 351b are displaced towards one another during installation of the removable slat 340.

In the embodiment illustrated in FIG. 11, a first leg 351a is offset in a lateral direction from a second leg 351b. Offsetting the legs 351a, 351b in the width direction from one another can advantageously enhance clearance between legs 351a, 351b on adjacent slats 340, thereby preventing interference between adjacent legs 351a, 351b.

The embodiment illustrated in FIG. 11 differs from that illustrated in FIG. 10 in that the offset legs 351a, 351b differ at opposite ends of the slat 340. For example, in FIG. 11, the first leg 351a at a first end 398 of the slat 340, which is generally adjacent the leading edge 342, is offset towards a second end 399 of the slat 340. However, the corresponding leg 351a at the second end 399 of the slat 340 is not offset.

At the second end 399 of the slat 340 it is the second leg 351b, which is generally adjacent to the trailing edge 343, that is offset. Thus, the offset legs 351a, 351b are arranged in a staggered configuration as opposed to the symmetrical configuration of FIG. 10 in which both legs 351a (or both legs 351b) are offset.

In accordance with a preferred embodiment of the conveyor belt system, the compression gap can be adjusted according to varying sizes of food product. In one embodiment, the conveyor belt can be adjusted with respect to the reactive surface as illustrated and explained in U.S. Patent Publication No. 2010/0275789.

While the present invention has been described with respect to a particular embodiment of the present invention, this is by way of illustration for purposes of disclosure rather than to confine the invention to any specific arrangement as there are various alterations, changes, deviations, eliminations, substitutions, omissions and departures which may be made in the particular embodiment shown and described without departing from the scope of the claims.

What is claimed is:

1. A conveyor belt assembly for moving a food product through a food preparation device, the conveyor belt assembly comprising:
    a conveyor belt, the conveyor belt comprising a plurality of spaced rods including a first rod adjacent to a second rod;
    a slat including a flat body portion having a top surface and a bottom surface, the slat being removably attached to the conveyor belt between the first rod and the second rod by a first snap on mechanism and a second snap on mechanism;
    wherein each of the first and second snap on mechanisms comprising:
        two legs that extend away from the bottom surface of the flat body portion, the two legs being separated from one another by a gap,
        each of the two legs including an angled leading surface that forms a narrower leg portion between the gap and the angled leading surface at an end of the leg distal to the flat body portion and a wider leg portion between the gap and the angled leading surface proximate the flat body portion,
        the angled leading surface terminating at a peak, which defines the widest location of the wider leg portion, and each of the two legs comprises a notch located between the flat body portion and the peak, and
        the notch is sized and shaped to receive the first rod or the second rod between the peak and the flat body portion; and
    wherein the two legs of the first and second snap on mechanisms removably secure the slat to the conveyor belt by sliding along the angled leading surfaces between the first rod and the second rod, such sliding deforming the legs of the first or second snap on mechanism into the gap towards one another until the peak of each leg passes a tangential position of the first or second rod after which the legs return to an undeformed position and the first and second rods are seated in the respective notches.

2. The conveyor belt assembly of claim 1, wherein the gap includes a radiused top between the notches in the two legs of the first or second snap on mechanism.

3. The conveyor belt assembly of claim 1, wherein the two legs are offset from one another in a width direction of the slat.

4. The conveyor belt assembly of claim 1, wherein the notch includes a surface that forms an arc of a circle.

5. A food preparation device, comprising:
    A housing;
    a heating element located within the housing; and
    a conveyor belt assembly, the conveyor belt assembly comprising:
        a conveyor belt, the conveyor belt including a plurality of spaced rods including a first rod and a second rod;
        a slat including a flat body portion having a top surface and a bottom surface, the slat being removably attached to the conveyor belt between the first rod and the second rod by a first snap on mechanism and a second snap on mechanism;
        wherein each of the first and second snap on mechanisms comprising two legs that extend away from the bottom surface of the flat body portion, the two legs being separated from one another by a gap,
        each of the two legs including an angled leading surface that forms a narrower leg portion between the gap and the angled leading surface at an end of the leg distal to the flat body portion and a wider leg portion between the gap and the angled leading surface proximate the flat body portion,
        the angled leading surface terminating at a peak, which defines the widest location of the wider leg portion,
        each of the two legs comprises a notch located between the flat body portion and the peak, and
        the notch is sized and shaped to receive the first rod or the second rod between the peak and the flat body portion; and
    wherein the two legs of the first and second snap on mechanisms removably secure the slat to the conveyor belt by sliding along the angled leading surfaces between the first rod and the second rod, such sliding deforming the legs of the first or second snap on mechanism into the gap towards one another until the peak of each leg passes a tangential position of the first or second rod after which the legs return to an undeformed position and the first and second rods are seated in the respective notches.

6. The food preparation device of claim 5, wherein the gap includes a radiused top between the notches in the two legs of the first or second snap on mechanism.

7. The food preparation device of claim 5, wherein the notch includes a surface that forms an arc of a circle.

8. The conveyor belt assembly of claim 1, wherein the flat body portion comprises a first end, a second end, a leading edge, and a trailing edge, and the top surface is defined between the first and second ends and the leading and trailing edges and the bottom surface opposite the top surface.

9. The conveyor belt assembly of claim 8, wherein the first snap on mechanism is located at the first end of the flat body portion and extends perpendicularly away from the bottom surface and the second snap on mechanism is located at the second end of the flat body portion and extends perpendicularly away from the bottom surface.

10. The conveyor belt assembly of claim 9, wherein each spaced rod of the plurality of spaced rods comprises a supporting rod portion, the supporting rod portion terminating at each end with a loop element and a hook element.

11. The conveyor belt assembly of claim 10, wherein when the slat body is secured between the first and second rods, the first snap on mechanism and second snap on mechanism are adjacent respective loop and hook elements of the first and second rods of the plurality of spaced rods.

12. The conveyor belt assembly of claim 9, wherein one leg of the two legs of the first snap on mechanism is offset from the other leg of the two legs along the flat body portion towards the second end of the flat body portion.

13. The conveyor belt assembly of claim 12, wherein one leg of the two legs of the second snap on mechanism is offset from the other leg of the two legs along the flat body portion towards the first end of the flat body portion.

14. A slat for a conveyor belt assembly, the slat comprising:
   a flat body portion having a first end, a second end, a leading edge, a trailing edge, a top surface, and a bottom surface, wherein
      the top surface defined between the first and second ends and the leading and trailing edges, and
      the bottom surface opposite the top surface;
   a first snap on mechanism located at the first end of the flat body portion and extending away from the bottom surface, the first snap on mechanism having first and second legs separated by a first gap, and each of the first and second legs comprising:
      a first angled leading surface between a tip of the leg distal from the flat body portion and forming a narrowest portion of the leg between the first gap and the first angled leading surface and a first peak forming a widest portion of the leg between the first gap and the first angled leading surface;
      a first notch into the leg towards the first gap located between the flat body portion and the first peak, the first notch configured to receive a first rod or a second rod therein between the first peak and the flat body portion;
   a second snap on mechanism located at the second end of the flat body portion and extending away from the bottom surface, the second snap on mechanism having third and fourth legs separated by a second gap, and each of the third and fourth legs comprising:
      a second angled leading surface between a tip of the leg distal from the flat body portion and forming a narrowest portion of the leg between the second gap and the angled leading surface and a second peak forming a widest portion of the leg between the second gap and the second angled leading surface; and
      a second notch into the leg towards the second gap located between the flat body portion and the second peak, the second notch configured to receive the first rod or the second rod therein between the second peak and the flat body portion.

15. The slat for a conveyor belt assembly of claim 14, wherein the first leg is offset from the second leg along the flat body portion in the direction of the second end of the flat body portion.

16. The slat for a conveyor belt assembly of claim 15, wherein the third leg is offset from the fourth leg along the flat body portion in the direction of the first end of the flat body portion.

* * * * *